United States Patent [19]

Wang et al.

[11] Patent Number: 5,333,171
[45] Date of Patent: * Jul. 26, 1994

[54] ADAPTIVE SPEAKERPHONE SYSTEM

[75] Inventors: William Wang, Lexington; Richard M. Reich, Westwood, both of Mass.

[73] Assignee: Lifeline Systems, Inc., Watertown, Mass.

[*] Notice: The portion of the term of this patent subsequent to May 11, 2010 has been disclaimed.

[21] Appl. No.: 15,619

[22] Filed: Feb. 9, 1993

Related U.S. Application Data

[63] Continuation of Ser. No. 722,921, Jun. 28, 1991, Pat. No. 5,210,784.

[51] Int. Cl.⁵ .................... H04M 11/04; H04M 1/00
[52] U.S. Cl. ........................... 379/37; 379/38; 379/39; 379/388
[58] Field of Search ............... 379/37, 38, 39, 40, 379/388, 389, 390; 381/104, 107, 108; 340/565; 455/68, 38.3, 127, 343, 69, 34.1; 371/32, 33

[56] References Cited

U.S. PATENT DOCUMENTS

| 4,689,811 | 8/1987 | Lennstrom et al. | 379/38 |
| 4,760,593 | 7/1988 | Shapiro et al. | 379/38 |
| 4,763,349 | 8/1988 | Siegel et al. | 379/38 |
| 4,829,285 | 5/1989 | Brand et al. | 379/38 |
| 4,918,717 | 4/1990 | Bissonnette et al. | 379/40 |
| 5,129,098 | 7/1992 | McGirr et al. | 455/69 |

FOREIGN PATENT DOCUMENTS

| 2258623 | 7/1973 | Fed. Rep. of Germany | 371/33 |
| 0058357 | 3/1986 | Japan | 371/33 |
| 0099640 | 4/1988 | Japan | 371/33 |

OTHER PUBLICATIONS

The article "IBM Technical Disclosure Bulletin", L. Weiss, vol. 25 No. 10 Mar. 1983, pp. 5252-5253.

Primary Examiner—Curtis Kuntz
Assistant Examiner—Jason Chan
Attorney, Agent, or Firm—Weingarten, Schurgin, Gagnebin & Hayes

[57] ABSTRACT

A system and method for adjusting telephonic control signals transmitted from a central station to a remote station. The signals are automatically adjusted according to the response of the remote station. The signals are adjusted to control speakerphone operation at the remote station in such a way as to provide communication with minimum audible annoyance. The method is especially useful in a personal emergency response system in which the speakerphone is part of a subscriber station to achieve a greater voice range than a voice activated speakerphone system.

8 Claims, 4 Drawing Sheets

ADAPTIVE SPEAKERPHONE SYSTEM

RELATED APPLICATION

This application is a continuation of application Ser. No. 07/722,921, filed Jun. 28, 1991, entitled: ADAPTIVE SPEAKERPHONE SYSTEM now U.S. Pat. No. 5,210,784.

FIELD OF THE INVENTION

This invention relates generally to the field of telephonic communication and more particularly to the control of the strength and/or duration of speakerphone control signals.

BACKGROUND OF THE INVENTION

With an increasing percentage of the population comprising elderly or infirm persons living alone, the demand for a means to monitor the well-being of these individuals has increased. Periodic visits by other individuals, such as visiting nurses or family members, provide a measure of security, and the telephone provides a means for summoning help in an emergency. However, many situations immediately come to mind whereby an incapacitating emergency, such as a fall, occurs between such visits and when an individual is located some distance away from their phone.

As a result of the potential for these emergency situations, a number of service businesses have organized which provide a monitoring service for people living alone. Typically, a person (called a subscriber) wishing to be monitored is supplied with a remote station, called a home communicator. The remote station links the person's home with a central monitoring station by means of a telephone. Also typically, the subscriber is provided with a small personal help button which is worn by the subscriber and which is in radio communication with the remote station. In the event of an emergency the subscriber need only press a button on the personal help button to cause the remote station to call the the central monitoring station and indicate that the subscriber requests help.

When the central monitoring station receives the help call from the subscriber, the person at the central monitoring station attempts to establish two way communication with the subscriber in order to ascertain the nature of the emergency. This is generally accomplished by incorporating a speakerphone into the remote station. Control signals, such as a tone or a sequence of tones, which are sent from the central monitoring station, control the operation of the speakerphone at the remote station. Since the telephone lines linking the central monitoring station and the remote station may vary in quality, thereby causing variability in received signal levels, the intensity of the control signals must be sufficient to cause the remote station to respond to the control signals and yet not be so intense as to cause audio annoyance during the interval between the time the speakerphone switches from the speaker mode to microphone mode.

SUMMARY OF THE INVENTION

The invention relates to a system and method for adjusting the signal strength and/or duration of a control signal sent to a remote station in accordance with phoneline impairments including attenuation, noise and distortion, so as to provide a signal of sufficient strength to cause the remote station to respond to the signal and yet not be of such intensity so as to cause audio annoyance during switching. The system includes a remote station having a signal controlled speakerphone which is capable of communicating over the telephone network with a central monitoring station. The central monitoring station includes a telephonic control unit and signal processing unit.

When a subscriber needs assistance, the remote station, responding to the activation by the subscriber places a call to the central monitoring station. In response to receiving the call, the person monitoring the call at the central monitoring station attempts to establish two way communication with the subscriber by way of the speakerphone. The central monitoring station transmits a predetermined control signal or tone of a predetermined amplitude and duration to place the speakerphone at the remote station in speaker mode. Once the remote station has received the control signal, the remote station transmits an acknowledgment signal or tone in response to the control signal received.

If the remote station does not respond to the control signal within a predetermined time, the central monitoring station issues the control signal again but with a higher amplitude and/or longer duration. Each time the control signal is sent without receiving a response, the amplitude and duration of the control signal is increased. This continues either until communication is established or until a predetermined number of attempts have been made. The same procedure, but with a different control signal, is used to place the speakerphone in the transmit mode.

This method provides a means for determining the signal strength required to ensure proper communication without resulting in excessive audio annoyance being heard at the speaker as is unavoidable if the signal is used to switch the speakerphone from speaker mode to microphone mode.

DESCRIPTION OF THE DRAWINGS

These and further advantages of the invention are more readily understood with reference to the following description considered in conjunction with the accompanying drawings in which.

DESCRIPTION OF THE PREFERRED EMBODIMENT

Figure 1:
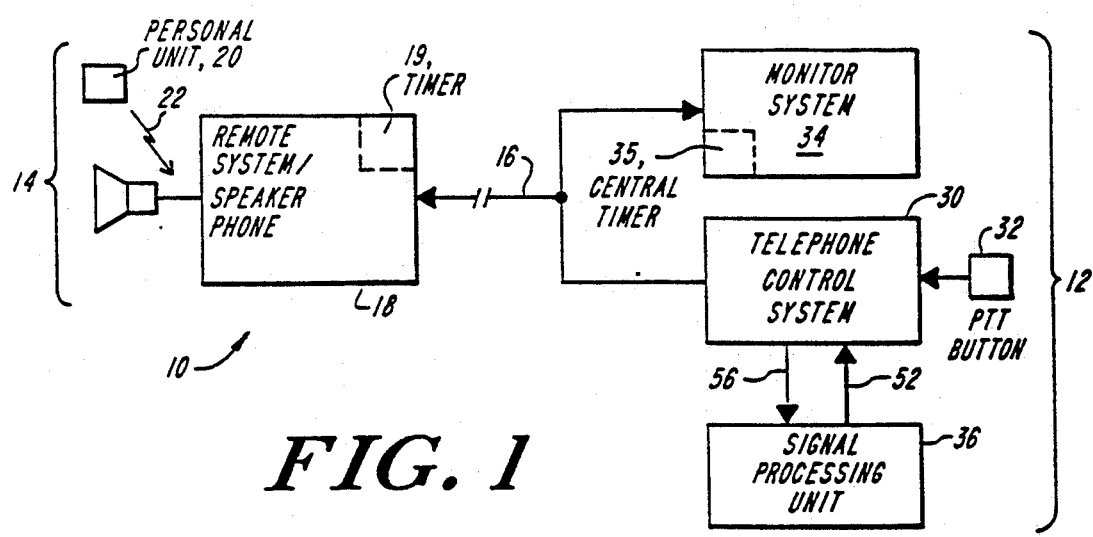
FIG. 1 is a block diagram of an embodiment of the system of the invention.

Referring to FIG. 1, in brief overview, a communications system 10 constructed in accordance with the invention includes a central station 12 in communication with a remote station 14 by way of a telephone network 16. The remote station 14 includes a speakerphone 18 which is capable of switching between speak and listen modes in response to control tones transmitted from the central 12 over station the telephone network 16. The remote station 14 is capable of establishing communication with the central station 12 in response to a predetermined action performed by a subscriber. In the embodiment shown, the subscriber calls for assistance by pressing a button on a portable personal help button 20. The portable personal help button 20 transmits a radio signal 22 to the remote station 14 which then calls the central monitoring station 12 over the telephone network 16.

The central station 12 includes a telephonic control unit 30 having a push-to-talk (PTT) button 32. The purpose of the PTT is to generate mode control tones. In the embodiment shown, the central station 12 also includes a monitoring unit 34 for processing the calls and a signal processing unit 36 which determines the strength of the telephonic control signal to be sent by the telephonic control unit 30 across the network 16.

Figure 2:
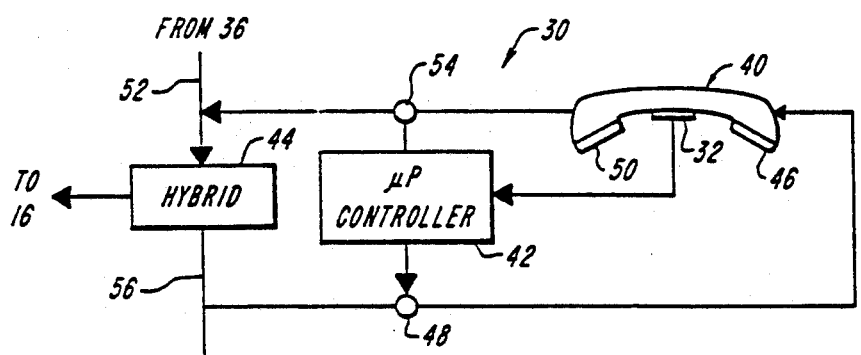
FIG. 2 is a block diagram of an embodiment of the telephonic control system of the embodiment of the invention depicted in FIG. 1.

In more detail, referring to FIG. 2, an embodiment of the telephonic control unit 30 having the PTT button 32 incorporated a handset 40, includes a microprocessor 42 and a hybrid transmission and reception unit 44. When the PTT button 32 on the handset 40 is depressed, a signal is sent to the microprocessor 42. The microprocessor 41; disconnects the receiver portion (earpiece) 46 of the handset 40 from the hybrid unit 44 by means of a switch 48. Simultaneously, the microprocessor 42 closes switch 54 thereby connecting the microphone portion 50 of the handset 40 and enabling the tone generator. This permits the control tones and voice signals to be transmitted to the remote station 14 over the telephone network 16.

When the person at the central station 12 has finished talking, the person releases the FTT button 32 causing the microprocessor 42 to transmit another control tone and open switch 54 thereby disconnecting the hybrid unit 44 from the microphone portion 50 of the handset 40. Simultaneously, the microprocessor 42 connects the receiver portion 46 of the handset 40 to the hybrid unit 44 by closing switch 48.

Figure 3:
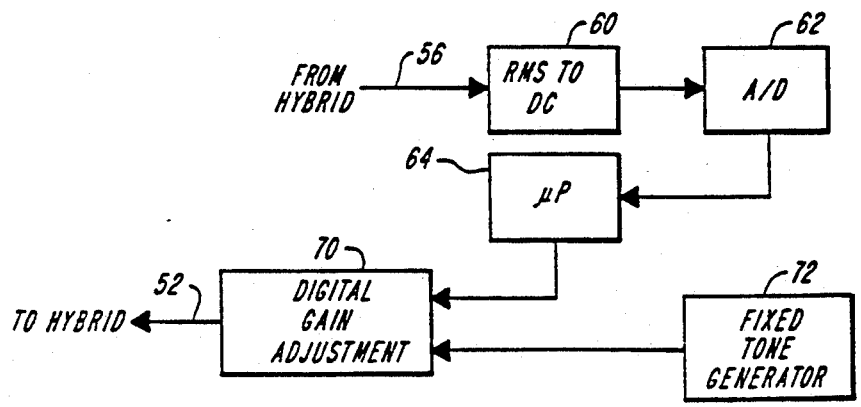
FIG. 3 is a block diagram of an embodiment of the signal processing unit of the embodiment of the invention depicted in FIG. 1.

Referring to FIG. 3, the signals received by the hybrid unit 44 from the telephone network 16 are sent over line 56 to the signal processing unit 36. An RMS to DC converter 60 produces a value from the received signal. The DC value is digitized by an analog to digital (A/D) converter 62 and the resulting digital value used by a microprocessor 64 for determining signal strength.

The microprocessor 64 calculates an initial output signal level (So) from the predetermined desired level of signal (Sd) to be received at the remote station 18, the predetermined level signal (S1) initially transmitted by the remote station 18 and the measured signal level (Sr) received by the central station 12 and digitized by the A/D converter 62. The initial output signal level intensity to be transmitted by the central station 12 is given by the equation:

$$So = Sd + Sl - Sr$$

The output signal value (So) is used initially to set the gain in a digitally controlled amplifier 70. A tone generator 72 generating fixed amplitude signals supplies the tone signal which is amplified by the digitally controlled amplifier 70 and transmitted to the hybrid unit 44 for transmission over the telephone network 16.

This method compensates for the attenuation of the signal by the network 16 by transmitting signals at an initial signal strength which is determined from a measurement of the received signal strength and which results from the attenuation by the network 16 of the transmitted signal.

Figure 4:
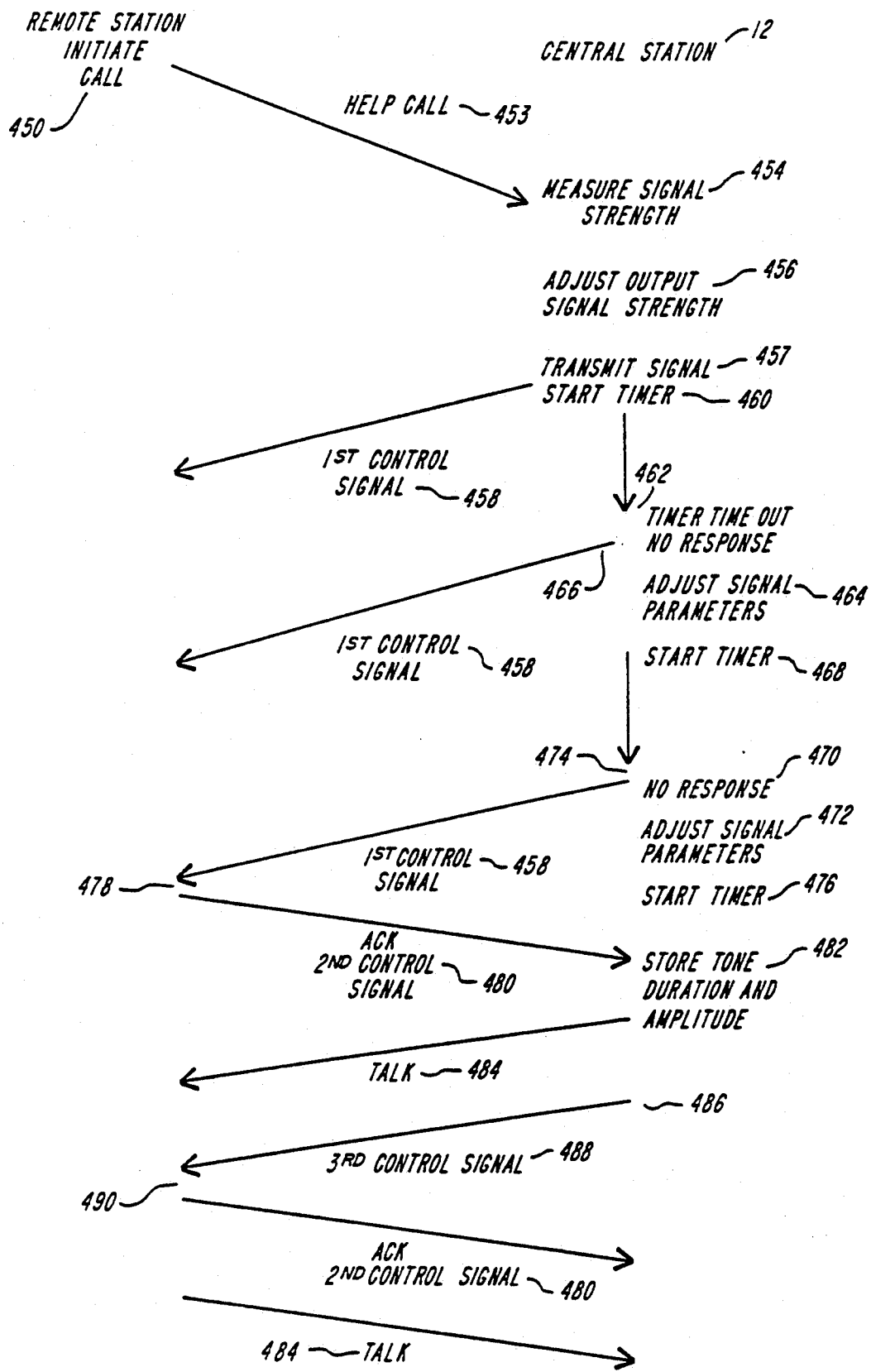
FIG. 4 is a flow diagram of the method of operation used with the system of FIG. 1.

Referring also to FIG. 4, the system 10 depicted in FIG. 1 may be best understood in terms of its method of operation. The remote station 14 initiates 450 a call to the central station 12. The help-call signal 453 is transmitted over the telephone network 16 and received by the central station 12 which measures 454 the signal strength of the help-call signal 453 and determines the control signal strength using the signal tone level processing unit 36 as described in the above-said algorithm.

After the signal strength is measured by the signal processing unit 36, the signal processing unit 36 sets 456 an initial output signal strength and transmits 457 a first control signal 458 when PTT button is pressed. The first control signal 458, in this embodiment a pound sign (#) tone instructs the speakerphone 18 to enter the speaker mode. A central timer 35 is started 460 and the telephonic control unit 30 awaits the reception of an acknowledgment signal from the remote unit 14. If the central timer 35 times out 462, indicating that no acknowledgment has been received from the remote station 14, the signal parameters are adjusted 464 to generate a tone of greater amplitude, or duration or both.

The first control signal 458 is retransmitted 466 and the central timer 35 is restarred 468. If the central timer 35 times out 470 again, indicating no acknowledgment has been received from the remote station 14, the signal parameters are again adjusted 472, the first control signal 458 retransmitted 474 at increased level and the central timer 35 again restarted 476. This process is repeated until the signal strength and/or duration of the first control signal 458 is sufficient to evoke a response by the remote station 14 or until a predetermined number of attempts has been performed.

When the remote station 14 detects a signal strength sufficient to evoke the desired response, it switches into the listen mode and transmits 478 an acknowledgment or second control signal 480. In the embodiment herein disclosed, the acknowledgment signal is a zero (0) tone.

The central station 12 then stores 482 the control signal parameters so that subsequent control signals can be transmitted at a strength and duration sufficient to cause the remote station 14 to respond quickly but not at an intensity so as to cause annoying audio problems. At this point, the personnel at the central station 12 can talk 484 to the subscriber by way of the speakerphone as long as the PTT button is depressed. In the embodiment shown, the generation of the first control signal 458 is in response to the depressing of the PTT button 32. Alternatively, the sequence just described could be automatically invoked upon the reception of the help-call 453 by the central station 12.

Once the person, at the central station 12, talking to the subscriber is finished talking and wishes to hear a response by the subscriber, the central station 12, in response to the release of PTT button by the person at the central station 12, transmits 486 a third control signal 488 instructing the speakerphone 18 at the remote station 14 to enter the talk mode. This signal is transmitted with the signal strength and duration which was previously stored following the first control signal transmission. In the embodiment disclosed herein, the third control signal is a star (*) tone and is transmitted in response to the releasing the PTT button 32. Again such a tone could automatically be generated once the person at the central station 12 ceases talking for a predetermined length of time.

The speakerphone 18 at the remote station 14 then enters the transmit mode and transmits 490 another acknowledgment signal 480. The person at the central station can then listen 484 to the subscriber. Although tones corresponding to the "touch" tones are used as control tones in the embodiment herein disclosed, other tones within the bandwidth of the telephone network may also be used. The conversation between the person at the central monitoring station 12 and the subscriber thus may continue with the remote station 14 switching the remote station between talk and listen mode in response to the depressing and releasing of the PTT button 32 by the person monitoring the call.

Figure 5:
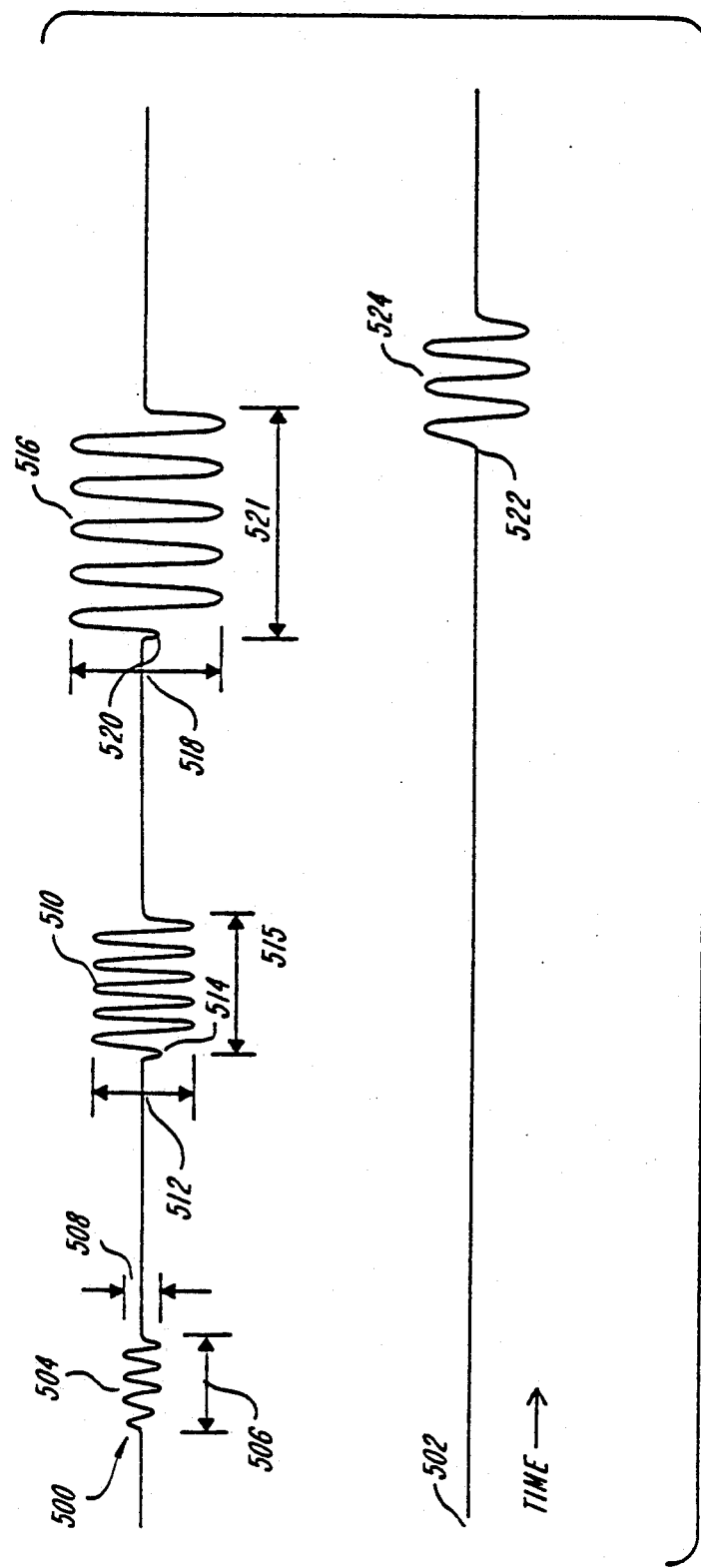
FIG. 5 is a diagram of a series of waveforms as generated according to one embodiment of the method of operation shown in FIG. 4.

FIG. 5 depicts the waveforms generated and their timing for the process just described. Upon receipt of the help-call 453, the central station transmits 500 a signal (tone) 504 of a predetermine duration 506 and amplitude 508. In the embodiment shown, the duration of the signal is initially 200 msec. If no response is received 502 from the remote unit 14, the first control signal 510 is transmitted again 514 with increased amplitude 512 and/or duration 515. This process is repeated until a tone 516 is transmitted 520 with a sufficient amplitude 518 and/or duration 521 to cause the remote unit 14 to generate 522 an acknowledgment signal 524 or until a predetermined number of attempts have been made.

Figure 6:
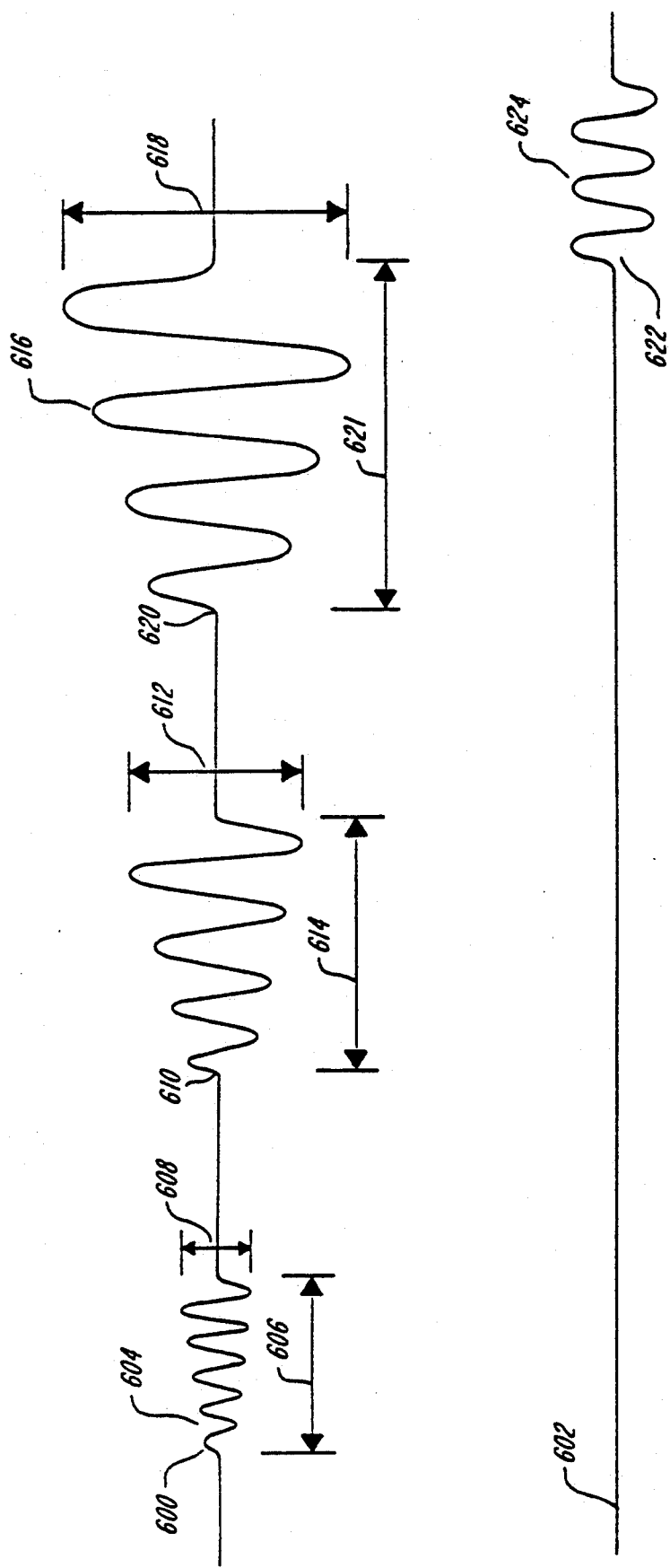
FIG. 6 is a diagram of a series of waveforms as generated according to another embodiment of the invention.

FIG. 6 depicts the alternative waveforms which may be used by the method described. Upon receipt of the help call 453, the central station transmits 600 a tone 604 of a predetermined duration 606 and amplitude but which is ramped up in intensity to a predetermined value 608 over the duration 606. If no response is received 602 from the remote unit 14, the control signal is transmitted again 610 but with an initial intensity approximately equal to ½ the final intensity 608 of the previous transmission 604 but for a duration 614 and final intensity 612 which is greater then the duration 606 and final intensity 608 of the previous waveform 604. This process is repeated until a tone 616 is transmitted 620 with a sufficient amplitude 618 and/or duration 621 to cause the remote unit 14 to generate 622 an acknowledgment signal 624 or until a predetermined number of attempts have been made.

Other embodiments and modification are possible which fall within the scope of the claims and it is the intent to limit the scope of the invention only by the scope of the claims.

I claim:

1. A method of operating a communications system including a central station and a remote station, said method comprising the steps of:
    a. sending a request signal from the remote station to the central station;
    b. receiving at the central station the request signal sent from said remote station;
    c. sending a control signal in response to said request signal to said remote station from said central station, said control signal having a signal strength and a signal duration, said control signal for determining signal strength and duration characteristics capable of evoking an acknowledge signal from said remote station and permitting subsequent voice communication;
    d. starting a central timer to measure a predetermined amount of time subsequent to sending said control signal;
    e. determining if said acknowledge signal has been received from said remote station prior to said central timer measuring said predetermined amount of time;
    f. sending a next control signal to said remote station from said central station if said determining step indicates that said acknowledge signal has not been received from said remote station, said next control signal having at least one of:
        a signal strength greater than said signal strength of said control signal sent immediately previous to said next control signal; and
        a signal duration greater than said signal duration of said control signal sent immediately previous to said next control signal;
    g. repeating steps d through f until a first one of:
        said remote station responds with said acknowledge signal; and
        said steps d through f have been repeated a predetermined number of times; and
    h. if said remote station responds with said acknowledge signal, sending at least one subsequent control signal to said remote station from said central station said at least one subsequent control signal having a signal strength and duration equal to the signal strength and duration of the control signal sent by said central station to which said remote station responded.

2. The method of claim 1 further including the step of measuring the strength of the request signal received from said remote station by said central station prior to sending said control signal to said remote station.

3. The method recited in claim 1 wherein said signal strength and duration characteristics are related to signal attenuation during transmission between said remote station and said central station.

4. A system comprising:
    a central station; and
    a remote station for communicating with said central station wherein said remote station initiates communication with said central station by sending a request signal to said central station and wherein, in response to said request signal, said central station sends a control signal to said remote station, said control signal having a control signal strength and a control signal duration, said control signal for determining signal strength and duration characteristics capable of evoking an acknowledge signal from said remote station and permitting subsequent voice communication;
    wherein said central station comprises:
        a central timer for measuring a predetermined amount of time following the sending of said control signal; and
        a processor for determining if said acknowledge signal has been received from said remote station prior to said central timer measuring said predetermined amount of time, and wherein if said acknowledge signal has not been received from said remote station, said central station sends a next control signal to said remote station, said next control signal having at least one of:
        a signal strength greater than said signal strength of said control signal sent immediately previous to said next control signal; and a signal duration longer than said signal duration of said control signal sent immediately previous to said next control signal; and wherein said central station sends subsequent control signals with a signal strength and signal duration equal to the signal strength and signal duration of the control signal to which said remote station responded.

5. The system of claim 4 further comprising a signal processing circuit for measuring the signal strength of the request signal received from said remote station.

6. The system recited in claim 4 wherein said signal strength and duration characteristics are related to signal attenuation during transmission between said remote station and said central station.

7. A central station for communicating with a speakerphone at a remote station, said central station comprising:

a central timer for measuring a predetermined amount of time; and a processor for determining if an acknowledge signal has been received from said remote station prior to said central timer measuring said predetermined amount of time wherein said central station sends a control signal to said remote station in response to a request signal sent to said central station by said remote station, said control signal having a control signal strength and a control signal duration, said control signal for determining signal strength and duration characteristics capable of evoking said acknowledge signal from said remote station and permitting subsequent voice communication, wherein if said central station fails to receive the acknowledge signal from said remote station, said central station sends a subsequent control signal to said remote station said subsequent control signal having at least one of:

a control signal strength greater than the control signal strength of said control signal; and a control signal duration longer than the control signal duration of said control signal; and sending additional subsequent control signals at a control signal strength and a control signal duration equal to the control signal strength and the control signal duration of the control signal to which said remote station responded.

8. The central station recited in claim 7 wherein said signal strength and duration characteristics are related to signal attenuation during transmission between said remote station and said central station.

* * * * *

UNITED STATES PATENT AND TRADEMARK OFFICE
CERTIFICATE OF CORRECTION

PATENT NO. : 5,333,171
DATED : July 26, 1994
INVENTOR(S) : William Wang, et al.

It is certified that error appears in the above-indentified patent and that said Letters Patent is hereby corrected as shown below:

Column 3, line 2, "the central 12 over station" should read --the central station 12 over--.

Column 3, line 25, "microprocessor 41; should read --microprocessor 42--.

Signed and Sealed this

Twenty-eight Day of February, 1995

Attest:

BRUCE LEHMAN

*Attesting Officer*  *Commissioner of Patents and Trademarks*